July 4, 1961  R. R. KING  2,990,928
DRIVE CONTROL SYSTEM
Filed July 28, 1959
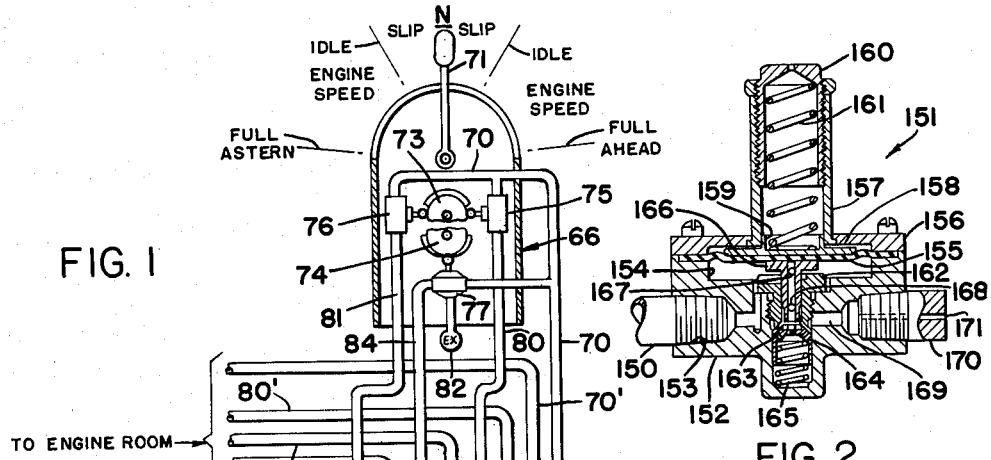
FIG. 1
FIG. 2
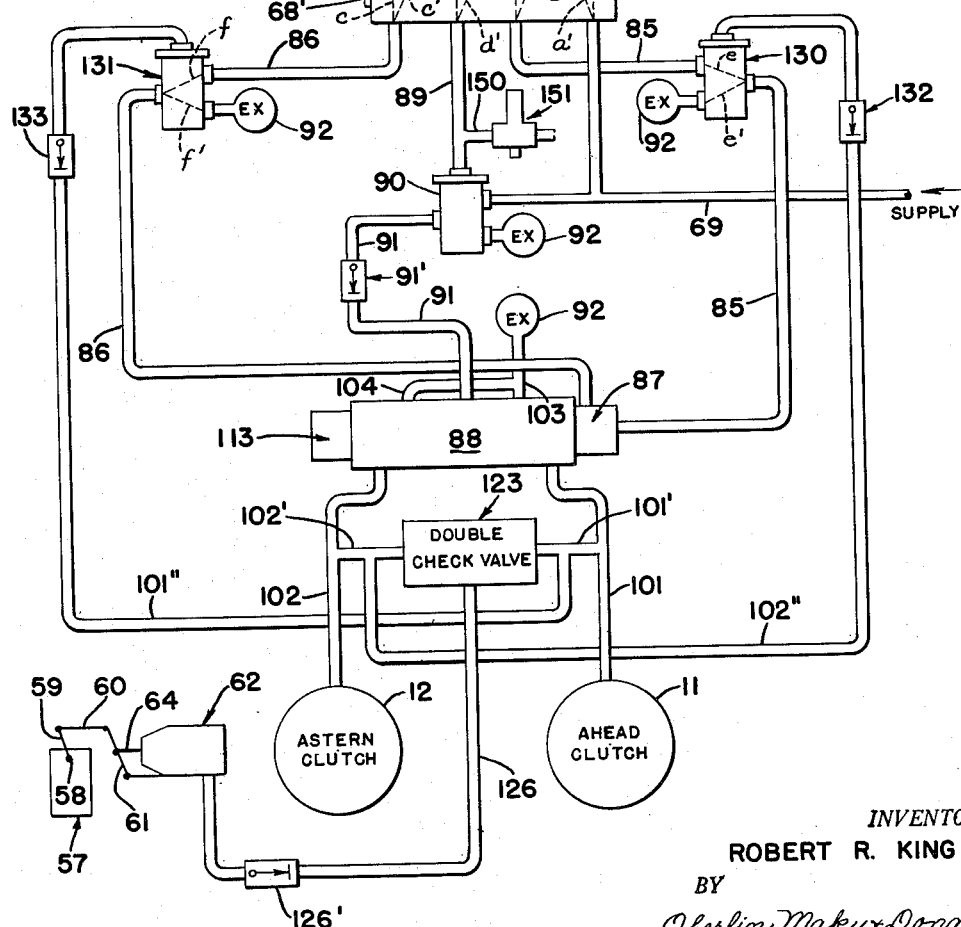
*INVENTOR.*
ROBERT R. KING
BY
Oberlin, Maky & Donnelly
ATTORNEYS

United States Patent Office 2,990,928
Patented July 4, 1961

2,990,928
DRIVE CONTROL SYSTEM
Robert R. King, 17208 Lake Ave., Lakewood, Ohio
Filed July 28, 1959, Ser. No. 830,134
6 Claims. (Cl. 192—87)

This invention relates to a fluid-operated control system for drive mechanism and the like and, more particularly, to drive control apparatus of the type disclosed in my co-pending application Serial No. 705,006, filed on December 24, 1957, now Patent No. 2,925,156, dated February 16, 1960.

Such prior application discloses in detail a marine drive and control system for a prime mover having speed setting means and ahead and astern driving clutches, with a single-lever maneuvering control mechanism provided to interconnect such speed setting means and clutches. For convenience, the present improvements will be considered and set forth with reference to this type of marine propulsion drive, and reference may of course be had to the aforesaid co-pending application for added details not necessary to full and ready understanding of the instant invention and accordingly unillustrated herein.

The clutches used in this marine drive are fluid-operated and the control system therefor includes a first section, which may conveniently be regarded as an actuator section, in which the noted control lever is operative to determine, among other things, development of a pressure signal in accordance with manual positioning of the same. Another section, which may be termed a working section to distinguish the same from such actuator section, is supplied directly with fluid under pressure from the available source of the same and operates automatically to control delivery of the fluid to the clutches and to the engine speed control as well, the latter being a conventional form of centrifugal governor. The two such control system sections are, in the sense outlined above, in parallel with respect to the source, and accordingly provision must be made for regulating the fluid pressure response of the working section in accordance with the pressure signal developed in the actuator section as the result of the indicated manual adjustment of the latter. Such operative relation of the two sections is accomplished by means of a fluid-operated pressure regulating valve connected in the supply line to the working section and operated by the fluid of the actuator section, this valve being thereby actuated to duplicate the pressure signal in the working section.

The time response of the system will thus be seen to depend on the development and control of the variable pressure signal, and it has been found that significant lag sometimes occurs, particularly during the low pressure stages of operation. The control lever has of course a neutral or zero pressure position from which it is moved in one direction or the other to actuate the desired clutch in accordance with progressive increase in the signal pressure thus resulting; moreover, upon reversal of the drive direction, the lever must move through its neutral position, with the signal pressure here being gradually reduced to zero and then increased again as the lever moves to its relatively reversed position.

It is therefore a primary object of the present invention to provide a fluid control system for drive mechanisms and the like having signal developing and working pressure sections, as discussed in the above, in which the sensitivity of the former section is enhanced to improve the time response of the system.

As will appear more fully hereinbelow, the contemplated system is operative with a predetermined clutch slip pressure range of from 0 to about 10 pounds per square inch, the latter being the inflation pressure for full engagement of a clutch under engine idle maximum torque conditions. When the control lever is moved from its neutral position, the initial developed pressure, about three pounds per square inch, is adequate to overcome spring biasing of the clutch to be actuated, and the pressure is increased to decrease the slip to the indicated inflation pressure, without however producing any change in the governor speed setting. Shortly after full clutch engagement, at about twelve pounds per square inch, the pressure is sufficient to balance spring bias provided in the engine governor assembly. It is in this pressure range, that is, the clutch slip range, that the indicated slow response has been observed, and a more particular object of the invention is accordingly to improve the response of such a system when operative in its range of clutch slip.

A further object is to provide controlled venting or exhaust of the actuator section of such a system to accelerate the response thereof to adjustment, without however unduly taxing the supply of the pressure fluid to the system.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a diagrammatic view of a marine drive control system in accordance with the present invention; and FIG. 2 illustrates in section and to an enlarged scale the detailed assembly of one of the system components.

Referring now to the drawings in detail, reference numerals 11 and 12 designate, respectively, ahead and astern fluid couplings of a two-way reverse clutch of the type fully illustrated and described in my aforesaid co-pending application. These two couplings are of course selective actuatable drivingly to interconnect a unidirectional engine to a propeller drive shaft of a ship, in the marine drive contemplated, to provide forward or reverse drive through a suitable reverse and reduction gear mechanism. Such couplings are independently operable by fluid pressure and in a first range of operation are adapted to provide controllable slip of the propeller shaft relative to the driving engine, with the speed of the output shaft substantially proportional to the actuating pressure applied up to a given pressure at which either coupling is normally fully engaged under engine idle speed and load conditions. Further increase in the actuating pressure serves to increase further the speed and torque capacity of the coupling.

There is also illustrated, for control of the engine speed, an engine driven centrifugal governor 57 of suitable conventional type shown here as having a speed setting shaft 58 and a lever arm 59 secured to the same. This shaft is adapted upon rotation in a counterclockwise direction, as viewed in FIG. 1, to increase the governor speed setting and condition the governor to regulate the fuel supply to the engine to maintain engine speed and power output in well-known manner. The outer end of the lever 59 is pivotally connected to a link 60, with the latter pivotally connected intermediate the ends of an output lever 61 of a pressure operated actuator unit 62. Such actuator unit reciprocates a rod 64 pivotally connected to the output lever 61; an increase in pressure supplied to the actuator effects the counterclockwise speed increasing the movement of the lever between suitable stops not shown. It will be also understood that the actuator is biased in a fuel decreasing direction by appropriate spring means.

For control of such units, i.e. the fluid clutches and the speed governor, there is a control stand 66 which may for example be located in the pilothouse of a ship, with a duplicate stand (not shown) preferably provided in the engine room. Only one such control stand can be operative at any given time, and a transfer valve 68, having a manually actuated valve member 68', is utilized selectively to connect the control stands to a main pressure supply line 69 which here provides the illustrated system with air under pressure from a suitable source of supply in the ship.

In the illustrated condition of such transfer valve, the member 68' thereof has a passage $a$ connecting the supply pipe 69 to pipe 70 for supplying the air under pressure to the control stand 66, whereby the same is effective to control operation of the reverse clutch mechanism and the engine governor actuator.

A single manually operable maneuvering control lever 71 is mounted for arcuate movement in the housing of the control stand 66; as will appear more fully below, the lever is in a neutral position N when vertical and can be moved to either side approximately ninety degrees respectively to full ahead and full astern positions as indicated by the legends. Such movement of the lever 71 actuates cams 73 and 74 and the latter are operative upon turning selectively to actuate an ahead shift control valve 75, an astern shift control valve 76, and a variable pressure regulator valve 77 in accordance with the direction and degree of movement of the control lever 71 from its neutral position. The several such valves of course have actuators biased into engagement with the cam surfaces they are respectively to follow, and the regulator valve 77 is of suitable available spring-diaphragm type, with adjustment varying the spring pressure to determine the delivered pressure. Such valve 77 may, for example, be of the type supplied by Westinghouse Air Brake Company as its H–3 valve.

Each such control stand valve is in a separate line connected to the stand supply pipe 70 and extending to the transfer valve 68. The valve 75 is thus connected in the line 80, valve 76 in line 81, connectible to an exhaust header 82 through the valve 77 when the lever 71 is in neutral position, and valve 77 in a speed and inflation control line 84. It may here be noted that identical lines, designated with primed numerals, lead from the transfer valve 68 to the engine room stand, not shown but identical to the stand 66, and the transfer valve has corresponding passages respectively associated with each set of lines.

With the control stand 66 operative, and thus connected to the main supply pipe through the passage $a$ of the transfer valve 68, the lines 80 and 81 are connected respectively through transfer valve passages $b$ and $c$ to pipes 85 and 86. The last two pipes are connected to opposite ends of a double-acting fluid motor 87 operable to control a four-way shift selector valve 88. The transfer valve member 68' also has a passage $d$ which interconnects the speed and inflation control line 84 and a further pipe 89, the latter leading to a pilot operated pressure regulating relay valve 90.

The valve 90 is adapted to interconnect a speed and inflation control pipe 91, having a flow control valve 91' therein, to a supply pipe 69 or to an exhaust header 92 and supplies an output pressure to the pipe 91 equal to the pilot signal imposed thereon through the line 89.

The four-way selector valve 88 has two outlet pipes, an ahead inflation control pipe 101 connected to the clutch 11 and an astern inflation control pipe 102 connected to the astern clutch 12. Such valve is also provided with two exhaust lines 103 and 104 leading to the common exhaust header 92. The construction of this valve is fully shown in my aforesaid co-pending application, and it will be clear from the connections noted here that such valve is operative to supply air under pressure from the line 91 selectively to the fluid clutches in accordance with the positioning thereof determined by the fluid motor 87. Such valve is, moreover, conventionally provided with a centering spring assembly 113, with the output lines 101 and 102 being respectively connected to the exhaust lines 103 and 104 in the centered rest condition of the valve.

A two-way or double check valve 123 is connected between the pipes 101 and 102 by branch pipes 101' and 102' for operation in response to the pressure supplied to either of the pipes 101 or 102, with the other line being vented to exhaust. Leading from this double valve 123 is a speed control pipe 126 connected to the speed governor actuator 62, through a flow control valve 126' of the type having an orifice limiting the flow of fluid to the actuator and a check valve permitting unrestricted flow therefrom.

In the system illustrated, the pilot pressure actuation of the four-way selector valve 88 is positively interlocked by means of suitable clutch inflation pressure actuated relays 130 and 131 to ensure complete disengagement of one clutch before the other clutch is actuated drivingly to connect the propeller shaft to the engine. Such relays 130 and 131 are associated with and adapted to control the flow of the pressurized air to the opposite ends of the shift selector valve actuating cylinder 87 through the pipes 85 and 86. The valve members of these two relays are normally spring biased to the positions indicated by the dashed lines $e$ and $f$ to provide through passages between the separate ends of the pipes 85 and 86. The pressure actuating means of the relay 130 is connected to the astern speed and inflation control pipe 102 by a pipe 102', and the pressure actuating means of the relay 131 is connected to the ahead inflation speed and control pipe 101 by the pipe 101'. Accordingly, when pressure is applied to the pipe 101, sufficient to initiate engagement of the ahead clutch, this signal is applied to the astern shift control relay 131 to operate the same to the position indicated by the broken line $f'$, whereby that portion of the pipe 86 between the cylinder 87 and the relay is connected to the exhaust header 92. Similarly, pressure supplied to the pipe 102 is effective on the ahead shift control relay 130 to connect the cylinder 87 to the exhaust header 92 as indicated by the broken line $e'$. Thus when the control lever 71 is reversed as in fast maneuvering, shifting of the selector valve to effect a reversal is prevented until the pressure in the engaged clutch is reduced to approximately its minimum inflation pressure.

A time delay in the build-up of the interlocking pressures applied to the relay valves 130 and 131, while permitting relatively unrestricted venting of such pressures from the same, is provided by two flow control valves 132 and 133 located in pipes 102" and 101" respectively.

Returning now to the clutch inflation and speed control line 84, the pressure signal developed therein by adjustment of the control stand valve 77 is, as pointed out earlier, applied to the duplicating relay valve 90 through the pipe 89. Such pipe 89 is provided with a branch 150, and an adjustable cut-off valve indicated generally at 151 is connected to such branch line.

As shown more clearly in FIG. 2, the valve assembly 151 comprises a casing 152 having an inlet 153, to which the branch pipe 150 is connected, leading to an inner chamber 154. A diaphragm 155, held by the housing cover 156, forms the top wall of such chamber and a hollow extension 157 projects centrally upward from the cover in an opening in the later provided therefor. A disc member 158 is disposed against the upper surface of the diaphragm and has a cylindrical upper flange 159, of smaller diameter, which fits within the cover extension. A spring retainer 160 is threaded into the outer end of such cover extension, and a spring 161 is positioned between such retainer and the disc 158 in contact with the diaphragm.

The valve housing is provided with a central recess below the diaphragm and a guide 162 is threaded into such recess at the upper or chamber end of the same. The lower end of such plug-like guide is tapered to form a conical valve seat 163 for cooperation with a valve member 164 in the recess therebelow and biased upwardly by means of a spring 165. The guide plug has a central bore in which a hollow plunger 166 is reciprocable, the upper end of this plunger being enlarged and engaging the lower surface of the diaphragm 155, while the bottom end of the plunger bears against the valve member 164. Such low end of the plunger is of reduced diameter to provide annular space thereabout opening on the valve seat, and an upper lateral hole 167 in the plunger provides communication with the diaphragm chamber, while a lower lateral hole 168 permits fluid to flow from the central plunger passage to the annular space at the valve seat. An outlet 169 leading from the recess is provided in the housing, and a plug 170 having a small bleed orifice 171 is threaded in such outlet, which will be seen to communicate with the inner space about the valve seat.

This valve is normally open, the condition shown in FIG. 2, whereby air entering the same through the inlet 153 passes to the diaphragm chamber 154, through the plunger 162 and valve opening, and to the outlet 169 for exhaust through the bleed orifice 171. The spring retainer 160 may be threaded in and out to vary the spring pressure on the diaphragm, made of suitable resiliently deformable material, and it will be clear that when the air pressure within the valve assembly exceeds the thus preset valve, the diaphragm will distend upwardly, and the valve member 164 will rise under the influence of its biasing spring to engage the seat 163 and thus cut off the flow to the outlet and the exhaust to the bleed orifice, the plunger 166 following the diaphragm movement.

The described control system accordingly comprises an actuator section for developing the pressure signal, this section including the supply pipe 70, regulating valve 77, line 84 (or the corresponding components of the engine room stand), and the pipe 89. The working section of the system is essentially comprised of supply line 69, the duplicating valve 90, pipe 91, valve 88, and the output lines of the latter to the controlled devices. As discussed at the outset, and as more fully considered in my aforesaid co-pending application, initial movement of the control lever 71 from its neutral position actuates one of the shift control valves 75 or 76, through turning of the cam 73, to supply actuating pressure to one end of the actuating cylinder 87 thereby causing the valve 88 to shift to one of its two control positions in accordance with the direction of the movement of the lever 71. Such initial movement of this lever also causes cam 74 to operate valve 77 to close the normal exhaust connection of the inflation and speed control pipe 84 to the exhaust header 82 and provide an initial supply of pressurized fluid of approximately three pounds per square inch to the pipe 84. This initial pressure is duplicated in the relay valve 90 and supplied through the selector valve 88 to the clutch to be actuated to overcome the spring bias of the same, whereby frictional driving engagement of such clutch is initiated to rotate the propeller shaft. Further advancement of the control lever 71 in either its ahead or astern control slip ranges serves to increase the actuating pressure thus supplied to the oncoming clutch thereby decreasing the slip and increasing the torque transmitted between the driving and driven members. Thus the propeller shaft speed may be effectively controlled by the operator selected position of the conrtol lever, with the actuating pressure supplied to such clutch generally effective to shift the two-way or double check valve 123 to apply pressure to the speed control pipe 126. However, when the control lever is in either of its clutch slip zones, the supply pressure will be ineffective to actuate the governor speed setting adjustment.

As the control 71 is advanced to an idle position, the inflation pressure supplied by the regulator valve 77 approaches the value of approximately ten pounds per square inch which is the inflation pressure needed for full engagement of the driving and driven members of the clutch unit under engine idle maximum torque conditions. When the pressure is further increased to approximately twelve pounds per square inch, the check valve 123 supplies the same through the speed control line 126 to the actuator 62 and this pressure is effective to counterbalance the spring bias of such actuator. Movement of the lever between idle and one or the other of its full speed positions varies the magnitude of the pressure signal in proportion to the degree of such movement, whereby for any given position in such range, a pressure signal is developed to establish a given torque capacity for the coupling and effect that adjustment of the governor speed setting which provides the desired engine speed and propeller shaft speed.

The control lever 71 is of course normally actuated rapidly, but the various flow control valves, such as the valve 91' and 126', have a retarding effect which ensures that the clutch inflation is smooth and that the governor speed setting is not advanced until sufficient clutch pressure has been developed. It is contemplated that a pressure up to sixty pounds per square inch will be available in the actuator section.

It is the function of the cut-off valve assembly 151 to provide rapid response of the actuator section at low operating pressures, and normally this valve will be set to close at about ten to twelve pounds per square inch, or at the end of the clutch slip range. Accordingly, at pressures within the slip range, of from zero to about ten or twelve pounds per square inch, the inflation and speed pipe 89 is vented through the valve 151 and its connected bleed orifice.

When the pipe 89 is thus vented, the loss of pressure resulting from the discharge through the valve 151, although small, is sufficient to prevent full seating of the regulator valve 77 in any position of adjustment of the same, so that this regulator valve remains at least slightly open throughout the noted low pressure setting range to either side of the neutral position. In other words, such venting or bleeding of the inflation and speed control line indicates an unsatisfied pressure demand to the valve 77, which would otherwise fully seat or close when the pressure delivered therethrough equals or exceeds the value set by the particular adjustment of the same. Since the regulator valve, which determines the system pressure signal, is thus here maintained more or less in dynamic functional condition at low pressures, it responds much more rapidly to changes in the adjusted pressure setting than has been the case when such valve is permitted to operate in usual regulator manner as heretofore.

The improved response of the new system is particularly evident in pressure-reducing shifts of the control lever, within the clutch slip range, due to the fact that fluid is exhausted at a faster rate from the line to the duplicating valve 90 when such a setting change occurs. In all adjustments within the range determined by the bleed cut-off, the action of the fluid in the regulator valve 77 is accelerated since there is less inertial resistance encountered, as compared to the opening of a fully closed valve.

It will be understood that the described bleeding of the inflation and speed control line will be at a small volume, the minimum which provides just enough pressure loss to keep the regulator valve "cracked." Such valve characteristically operates with good response at high pressures, and the bleeding is therefore cut off at the earlier indicated limit to conserve the pressure fluid supply of the ship, which will ordinarily be air, as also previously noted.

Reference to my above-identified co-pending application will show that the complete marine drive system described above in detail is but one of several such systems disclosed in said application, and it will be clear that the present improvements can be used as well in the here unillustrated forms of the prior invention which similarly employ variable regulators to develop pressure signals operative over a low range to control clutch slip in the same or an equivalent manner.

Other modes of applying the principle of the invention may be employed, change being made as regards the details described, provided the features stated in any of the following claims or the equivalent of such be employed.

I, therefore, particularly point out and distinctly claim as my invention:

1. In a fluid control system, pressure regulating valve means adapted to be connected to a source of pressurized fluid and operative to deliver the fluid at various pressures determined by adjustment thereof, a control element for adjusting said regulating valve means to selected pressure settings, pressure actuated means adapted to receive and contain pressurized fluid supplied thereto, a fluid delivery line leading from the regulating valve means to said pressure actuated means for such supply to the latter, a branch line connected to said fluid delivery line, normally open cut-off valve means in said branch line operative to close when the pressure in the delivery line equals or exceeds a predetermined value, and means in the branch line defining a relatively restricted bleed orifice for fluid passing through the cut-off valve means, a small amount of fluid thereby being bled from the delivery line when the cut-off valve means is open to prevent full closure of the regulating valve means at any selected pressure setting of the same below the pressure at which the cut-off valve means closes.

2. In a fluid control system for a fluid-operated coupling, pressure regulating valve means adapted to be connected to a source of pressurized fluid and operable to deliver a variable pressure signal, a control element for adjusting said regulating valve means to vary the delivered pressure signal of the same, pressure responsive valve means operative to control fluid flow to said coupling in accordance with the pressure signal developed by the regulating valve means, a fluid delivery line leading from the regulating valve means to said pressure responsive valve means to deliver the pressure signal to the latter, a branch line connected to said fluid delivery line, normally open cut-off valve means in said branch line operative to close when the pressure in the delivery line equals or exceeds the pressure at which the coupling becomes fully operative, and means in the branch line defining a relatively restricted bleed orifice for fluid passing through the cut-off valve means, a small amount of fluid thereby being bled from the delivery line when the cut-off valve means is open to prevent full closure of the regulating valve means at any selected pressure setting of the same below the pressure at which the cut-off valve means closes.

3. A pneumatic control system comprising an adjustable pressure regulator adapted to be connected to a source of air under pressure and to deliver pressure signals over a predetermined range in accordance with adjustment thereof, a conduit extending from the delivery side of said regulator, and air-operated device connected to said conduit for actuation by the pressure signals delivered by the regulator, an exhaust connection to said conduit for bleeding air therefrom through a relatively restricted orifice, and pressure responsive cut-off valve means in said exhaust connection, said cut-off valve means opening at pressures below an intermediate value within the regulator range of pressure signals and closing at higher pressures, air thereby being bled from the delivery line over an initial relatively low pressure portion of the available pressure range to require continual delivery by the regulator in all adjusted conditions of the same within such range portion.

4. In a drive control system including two fluid pressure operated couplings to provide alternative driving connections between a load and a prime mover, selector valve means for connecting one or the other of said couplings to a source of pressurized fluid, flow modulating valve means operative to regulate the supply of fluid to the couplings through the selector valve means in accordance with pressure signals delivered to the modulating valve means, an adjustable pressure regulator adapted to be connected to the source of pressurized fluid independently of the selector and modulating valve means, a conduit connecting the delivery side of said regulator to the modulating valve means to operate the latter in accordance with pressure signals thus supplied by the former, manual control means actuatable by a single lever for operating the selector valve means and adjusting the pressure regulator, said control lever having a neutral position, in which the regulator is closed, and a full pressure position to either side of such neutral position, adjustment of the lever to a selected position at either side of the neutral position actuating the regulator to deliver a predetermined pressure signal, a bleed connection to the delivery conduit between the regulator and the modulating valve means, normally open pressure responsive cut-off valve means in said bleed connection, and means for adjusting said cut-off valve means to close when the pressure in the delivery conduit is below a predetermined value intermediate the no-pressure and full pressure delivery conditions of the regulator, such bleeding precluding full closure of the regulator in any selected position of adjustment of the control means to either side of the neutral or no-pressure position which provides a pressure setting of the regulator below said predetermined value.

5. The combination set forth in claim 4 characterized further in that said cut-off valve is adjusted to remain open at any regulator pressure settings within the slip range of the fluid couplings.

6. The method of controlling operation of a fluid clutch which comprises the steps of supplying pressurized fluid to said clutch through flow modulating control means, developing a control signal in the form of air at predetermined superatmospheric pressure, applying said control signal to regulate operation of the flow modulating means, varying the signal pressure over an initial low range to control the slip of the clutch, bleeding a small volume of the signal air applied to the modulating means when at a presure within the range of clutch slip, and terminating such bleeding when the signal pressure equals or exceeds the pressure at which the clutch becomes fully engaged.

References Cited in the file of this patent

UNITED STATES PATENTS

| | | |
|---|---|---|
| 2,398,903 | Larson | Apr. 23, 1946 |
| 2,422,596 | Stevens | June 17, 1947 |
| 2,433,916 | May et al. | Jan. 6, 1948 |
| 2,815,684 | Roche | Dec. 10, 1957 |